US006658966B2

(12) United States Patent
Fortin et al.

(10) Patent No.: US 6,658,966 B2
(45) Date of Patent: Dec. 9, 2003

(54) WORK BENCH INCLUDING A VISE

(75) Inventors: Marc A. Fortin, Brockville (CA); Murray D. Hunter, Smiths Falls (CA)

(73) Assignee: Black & Decker Inc., Newark, DE (US)

(*) Notice: Subject to any disclaimer, the term of this patent is extended or adjusted under 35 U.S.C. 154(b) by 0 days.

(21) Appl. No.: 10/187,525

(22) Filed: Jul. 1, 2002

(65) Prior Publication Data

US 2002/0166405 A1 Nov. 14, 2002

Related U.S. Application Data

(62) Division of application No. 09/707,300, filed on Nov. 7, 2000, now Pat. No. 6,415,683, which is a division of application No. 08/692,062, filed on Aug. 7, 1996, now Pat. No. 6,196,534.

(51) Int. Cl.$^{7}$ .......................... F16H 57/02; F16H 7/08; G25G 25/00

(52) U.S. Cl. ............................ 74/608; 74/609; 74/612; 474/144; 474/111; 474/101; 474/140

(58) Field of Search .......................... 74/608–616, 545; D8/307, 309; 269/139, 220, 244, 901, 285, 329; 474/111, 140, 144, 101

(56) References Cited

U.S. PATENT DOCUMENTS

| | | | | | |
|---|---|---|---|---|---|
| 4,127,046 | A | * | 11/1978 | Jackson | 83/798 |
| 4,422,396 | A | * | 12/1983 | Szostak et al. | 474/144 X |
| 4,498,567 | A | * | 2/1985 | Aultz et al. | 192/133 |
| 5,235,874 | A | * | 8/1993 | Tabellini | 74/608 |
| 5,265,497 | A | * | 11/1993 | Curless | 74/608 |
| 5,284,331 | A | * | 2/1994 | Lee et al. | 269/16 |
| 5,383,977 | A | * | 1/1995 | Pearce | 144/286 |
| 5,437,319 | A | * | 8/1995 | Garuglieri | 144/286 R |
| 5,438,943 | A | * | 8/1995 | Kato et al. | 112/261 |
| 5,950,999 | A | * | 9/1999 | Lin | 269/139 |
| 6,149,145 | A | * | 11/2000 | Lin | 269/139 |
| 6,299,152 | B1 | * | 10/2001 | Sangmeister et al. | 269/139 |
| 6,484,767 | B2 | * | 11/2002 | Cameron | 144/154.5 |
| 2001/0051553 | A1 | * | 12/2001 | Peeters et al. | 474/133 |

FOREIGN PATENT DOCUMENTS

| | | | | |
|---|---|---|---|---|
| GB | 2035862 A | * | 6/1980 | 269/139 |
| GB | 2132546 | * | 10/1983 | 269/139 |
| JP | 5-203019 | * | 8/1993 | 74/608 |

* cited by examiner

*Primary Examiner*—Vinh T. Luong
(74) *Attorney, Agent, or Firm*—Harness, Dickey & Pierce, P.L.C.

(57) ABSTRACT

A work bench includes a frame, a bench surface on the frame with the bench surface including at least two members, one of which is movable along the frame for clamping a workpiece between the members. A mechanism for moving the member includes two screws coupled with the members. The two screws are spaced with the member for moving the member upon rotation of the screws. A sprocket is coupled with each of the screws. A transmission belt or chain is coupled with the sprockets. At least one handle is coupled with one of the screws to rotate the screws. At least one clutch is coupled with the at least one screw to limit clamping pressure on the workpiece. The clutch enables rotation of one screw with respect to the other screw so that workpieces may be clamped between the members and clamping of the workpiece may be accomplished by rotation of the screws with one hand of the operator. Also, a guard may be present which covers the transmission belt or chain. The handle may include a hub, a straight portion, and curved portion extending from the straight portion. A knob extends from the curved portion.

9 Claims, 7 Drawing Sheets

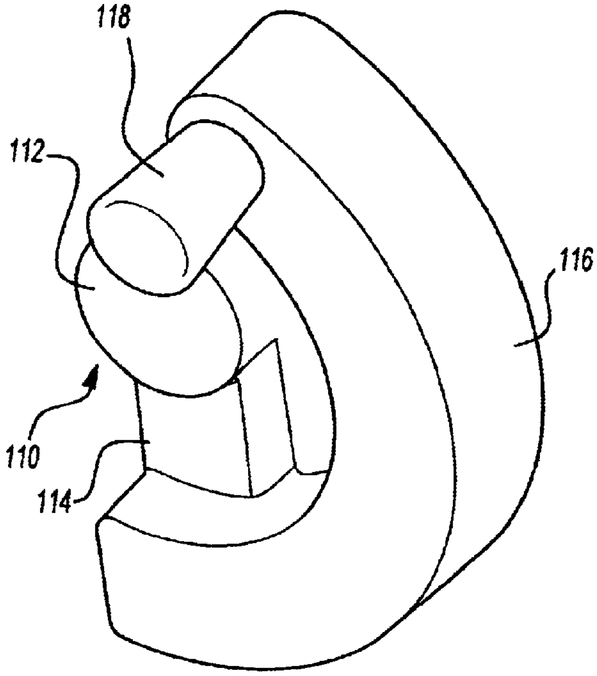
Fig-7
Fig-8
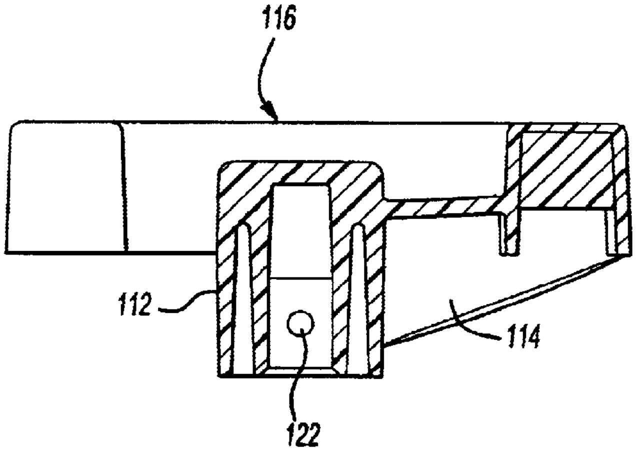
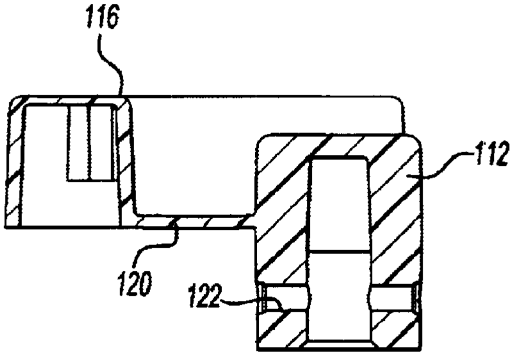
Fig-9

WORK BENCH INCLUDING A VISE

CROSS-REFERENCE TO RELATED APPLICATION

This is a divisional application of Ser. No. 09/707,300 filed Nov. 7, 2000 entitled Work Bench Including a Vice now U.S. Pat. No. 6,415,683 issued on Jul. 9, 2002.

FIELD OF THE INVENTION

The invention relates to portable work benches or tables which include an integral clamping table or vise. More particularly, the present invention relates to a work table with a clamping table or vise where the vise may be operated with one hand.

BACKGROUND OF THE INVENTION

Carpenters, woodworkers and handymen which work with wood as well as other materials, often need a work bench or table which may be utilized to hold workpieces. Ordinarily, these work benches include a vise which clamps portions of the table top together to secure the workpiece on the table. One such device is that of the assignee of the present invention which is sold under the WORKMATE™ trademark. These tables are versatile, provide for secure clamping, are compact and are convertible to dual height positions.

The work bench ordinarily includes two vise screws with handles on each one. The vise screws, via the handles, are operated by the user with the user using both hands. While a user may utilize one hand, the user must rotate both handles in order to clamp a workpiece between the clamping table members. Accordingly, it is desirable to utilize one hand to crank both of the vise screws so that clamping of the workpiece may be accomplished by the user using only one hand. By enabling cranking of the vise to clamp the workpiece with one hand, the user is capable of holding the workpiece in place with his other hand. Also, it is desirable that the vise clamp irregular objects while turning the vise screws with one hand.

SUMMARY OF THE INVENTION

Accordingly, it is an object of the present invention to provide an improved vise for a work bench which enables the vise to be tightened down utilizing one hand.

In accordance with one aspect of the invention, a work bench comprises a frame; a table surface on the frame, with the table surface including at least two members; one of which is movably coupled with the frame to enable clamping of a workpiece between the two table surface members. A drive mechanism moves the table members with respect to one another. The drive mechanism includes two screws coupled with one of the members. The two screws are spaced from one another to move the table member upon rotation of the screws. A sprocket is coupled with each screw. A transmission belt or chain is coupled with the sprocket to drive the screws together. At least one handle is coupled with one of the screws to rotate the screws. At least one clutch is coupled with at least one screw to limit clamping pressures on the workpiece. The clutch enables rotation of one screw with respect to the other screw so that irregular workpieces may be clamped between the table members and clamping of the workpiece may be accomplished by rotation of the handle by one hand of the operator. The clutch is self-actuating. The clutch includes a spring and a detent removably coupled within slots in a hub of the sprocket. Also, both screws may include a clutch. Further, each screw may include a handle. One of the handles has a different configuration than the other to identify to the user that clamping of the table surfaces may be accomplished by rotation of only one handle to drive both screws.

In accordance with a second embodiment, a work bench includes a frame; a table surface on the frame, with the table surface including at least two members; one of which is movably coupled with the frame to enable clamping of a workpiece between the two table surface members. A drive mechanism moves the table members with respect to one another. The drive mechanism includes two screws coupled with one of the members. The two screws are spaced from one another to move the table member upon rotation of the screws. A sprocket is coupled with each screw. A transmission belt or chain is coupled with the sprocket to drive the screws together. At least one handle is coupled with one of the screws to rotate the screws. At least one clutch is coupled with at least one screw to limit clamping pressures on the workpiece. The clutch enables rotation of one screw with respect to the other screw so that irregular workpieces may be clamped between the table members and clamping of the workpiece may be accomplished by rotation of the handle by one hand of the operator. A guard covers the transmission belt or chain. The guard is coupled with the frame. The guard includes at least one tensioning member unitarily formed with and extending from the guard. The guard includes at least one alignment member to maintain alignment of the belt or chain to the sprocket. A biasing member is associated with the belt or chain to automatically adjust to changes in the belt or chain length to take up slack and provide positive belt or chain tension. The biasing member may be a helical spring. Further, the guard may include two tensioning members as well as two pairs of alignment members, each pair sandwiching a tension member.

In accordance with a third aspect of the invention, a work bench comprises a frame; a table surface on the frame, with the table surface including at least two members; one of which is movably coupled with the frame to enable clamping of a workpiece between the two table surface members. A drive mechanism moves the table members with respect to one another. The drive mechanism includes two screws coupled with one of the members. The two screws are spaced from one another to move the table member upon rotation of the screws. A sprocket is coupled with each screw. A transmission belt or chain is coupled with the sprocket to drive the screws together. At least one handle is coupled with one of the screws to rotate the screws. At least one clutch is coupled with at least one screw to limit clamping pressures on the workpiece. The clutch enables rotation of one screw with respect to the other screw so that irregular workpieces may be clamped between the table members and clamping of the workpiece may be accomplished by rotation of the handle by one hand of the operator. The handle includes a hub, a straight portion extending from the hub, a curved portion extending from the straight portion, and a knob extending from the curved portion. The knob enables rotation of the handle. The curved portion has a truncated U-shape with one end coupled with the straight portion and the knob extending from the other end. The hub has a desired height as well does the straight portion which is less than that of the hub. The curved portion has a height greater than the hub. An end of the curved portion and a side of the straight portion are continuous forming a planar side portion of the handle. A connecting member extends from the hub and is unitary with the straight portion and a portion of the curved portion. The handle may be injected molded from a plastic material.

In accordance with a fourth aspect of the invention, a guard for a work bench drive transmission comprises a first wall, at least one second wall extending substantially perpendicular to the first wall, and at least one guide extending from the first wall. The guide extends transverse to the direction of travel of the transmission belt or chain. Preferably, a second guide extends from the first wall. Preferably, two parallel spaced second walls extend from the first wall. An alignment member extends from the first wall. Preferably, the alignment member is stamped into the first wall and two alignment members sandwich each guide member. Also, a second wall includes a biasing member to provide positive belt or chain tension. The first or second walls include cut-outs to secure the helical spring biasing member to the guard.

In accordance with a fifth aspect of the invention, a handle for operating a movable work bench comprises a hub, a straight portion extending from the hub, and a curved portion extending from the straight portion. A knob extends from the curved portion to enable rotation of the handle. The curved portion has a truncated U-shape with one end coupled with the straight portion and the knob extending from the other end. The hub has a desired height, as well does the straight portion, which is less than the height of the hub. Also, the curved portion has a height greater than the hub. Also, one end of the curved portion and a side of the straight portion are continuous forming a planar side portion of the handle. A connecting member extends between the hub, straight and curved portions, and is unitary with the three. The handle is ordinarily molded from a plastic material.

In accordance with a sixth aspect of the invention, a belt or chain drive transmission for a work bench comprises two screws adapted for coupling with a member to be moved against another member to provide clamping. A sprocket is coupled with each of the screws. A transmission belt or chain is coupled with the sprockets. At least one handle is coupled with one of the screws to rotate the screws. At least one clutch is coupled with at least one screw to limit clamping pressures on a workpiece. The clutch enables rotation of both screws, one with respect to the other which is being directly rotated. The clutch is self-actuating and includes a spring and a detent coupled with a slot in a hub of the sprocket. Preferably, each screw includes a clutch and each screw includes a handle. Also, one of the handles has a different configuration which identifies to the user that only one handle may be rotated to drive both the screws. Also, each screw includes a stop to position the spring with respect to the sprocket.

With respect to a seventh aspect of the invention, a work bench includes a frame; a table surface on the frame, with the table surface including at least two members; one of which is movably coupled with the frame to enable clamping of a workpiece between the two table surface members. A drive mechanism moves the table members with respect to one another. The drive mechanism includes two screws coupled with one of the members. The two screws are spaced from one another to move the table member upon rotation of the screws. A sprocket is coupled with each screw. A transmission belt or chain is coupled with the sprocket to drive the screws together. At least one handle is coupled with one of the screws to rotate the screws. At least one clutch is coupled with at least one screw to limit clamping pressures on the workpiece. The clutch enables rotation of one screw with respect to the other screw so that irregular workpieces may be clamped between the table members and clamping of the workpiece may be accomplished by rotation of the handle by one hand of the operator. A guard covers the transmission belt or chain. The guard is coupled with the frame. The guard includes at least one tensioning member unitarily formed with and extending from the guard. The guard includes at least one alignment member to maintain alignment of the belt or chain to the sprocket. A biasing member is associated with the belt or chain to automatically adjust to changes in the belt or chain length to take up slack and provide positive belt or chain tension. The biasing member may be a helical spring. Further, the guard may include two tensioning members as well as two pairs of alignment members, each pair sandwiching a tension member. The handle includes a hub, a straight portion extending from the hub, a curved portion extending from the straight portion, and a knob extending from the curved portion. The knob enables rotation of the handle. The curved portion has a truncated U-shape with one end coupled with the straight portion and the knob extending from the other end. The hub has a desired height as does the straight portion, which is less than that of the hub. The curved portion has a height greater than the hub. An end of the curved portion and a side of the straight portion are continuous to form a planar side portion of the handle. A connecting member extends from the hub and is unitary with the straight portion and a portion of the curved portion. The handle may be injected molded from a plastic material.

Additional objects and advantages of the invention will be apparent from the detailed description of the preferred embodiment, and the appended claims and accompanying drawings, or may be learned by practice of the invention.

BRIEF DESCRIPTION OF THE DRAWINGS

The accompanying drawings, which are incorporated in and constitute a part of the specification, illustrate one embodiment of the present invention and together, with the description, serve to explain the principles of the invention. In the drawings, the same reference numerals indicate the same parts.

FIG. 7 is a perspective view of the handle without the knob in accordance with the present invention.

FIG. 8 is a cross-section view of FIG. 7 along line 8—8 thereof.

FIG. 9 is a cross-section view of FIG. 7 along line 9—9 thereof.

DETAILED DESCRIPTION OF THE PREFERRED EMBODIMENT

Figure 1:
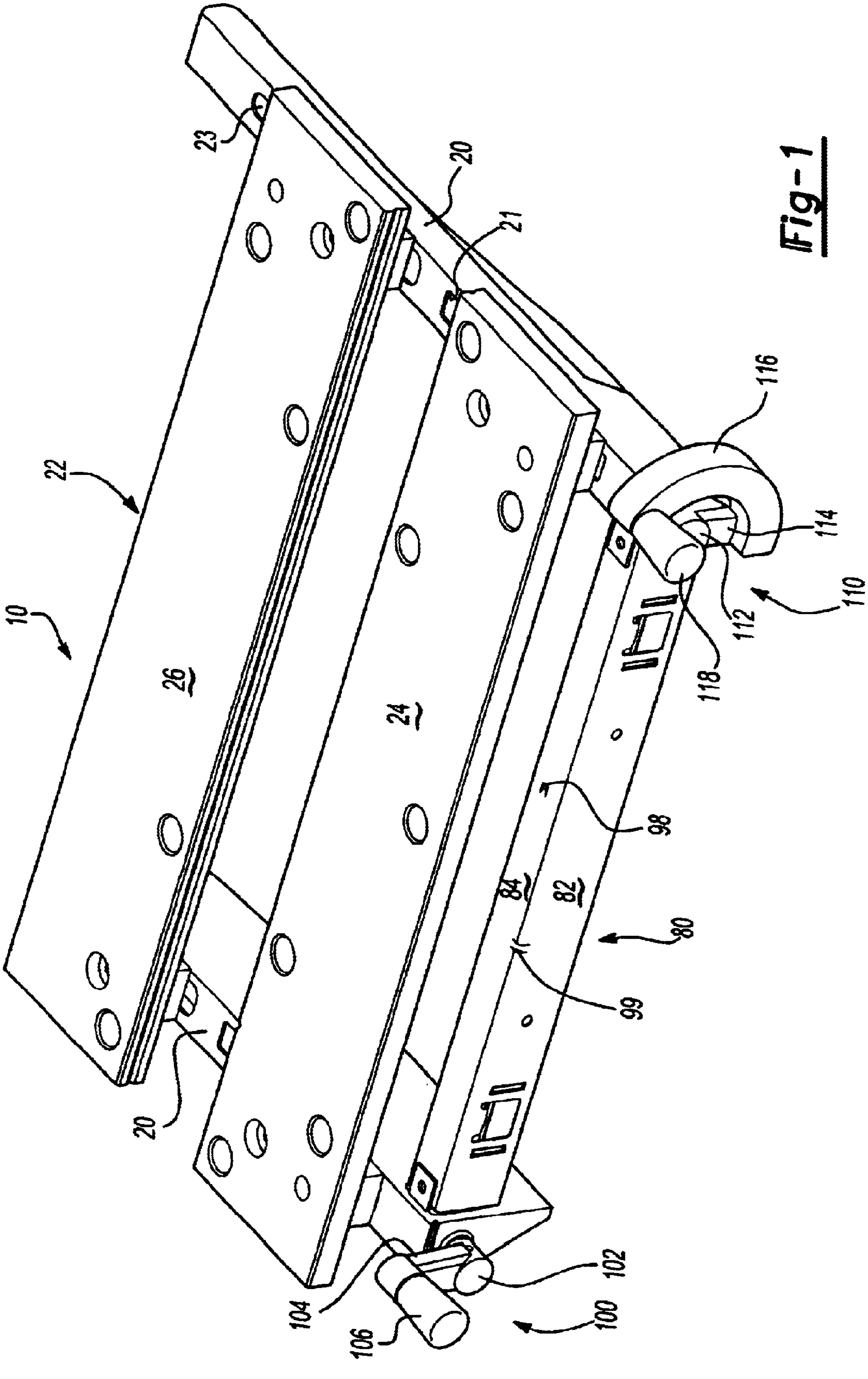
FIG. 1 is a perspective view of a work bench top in accordance with the present invention.
Figure 2:
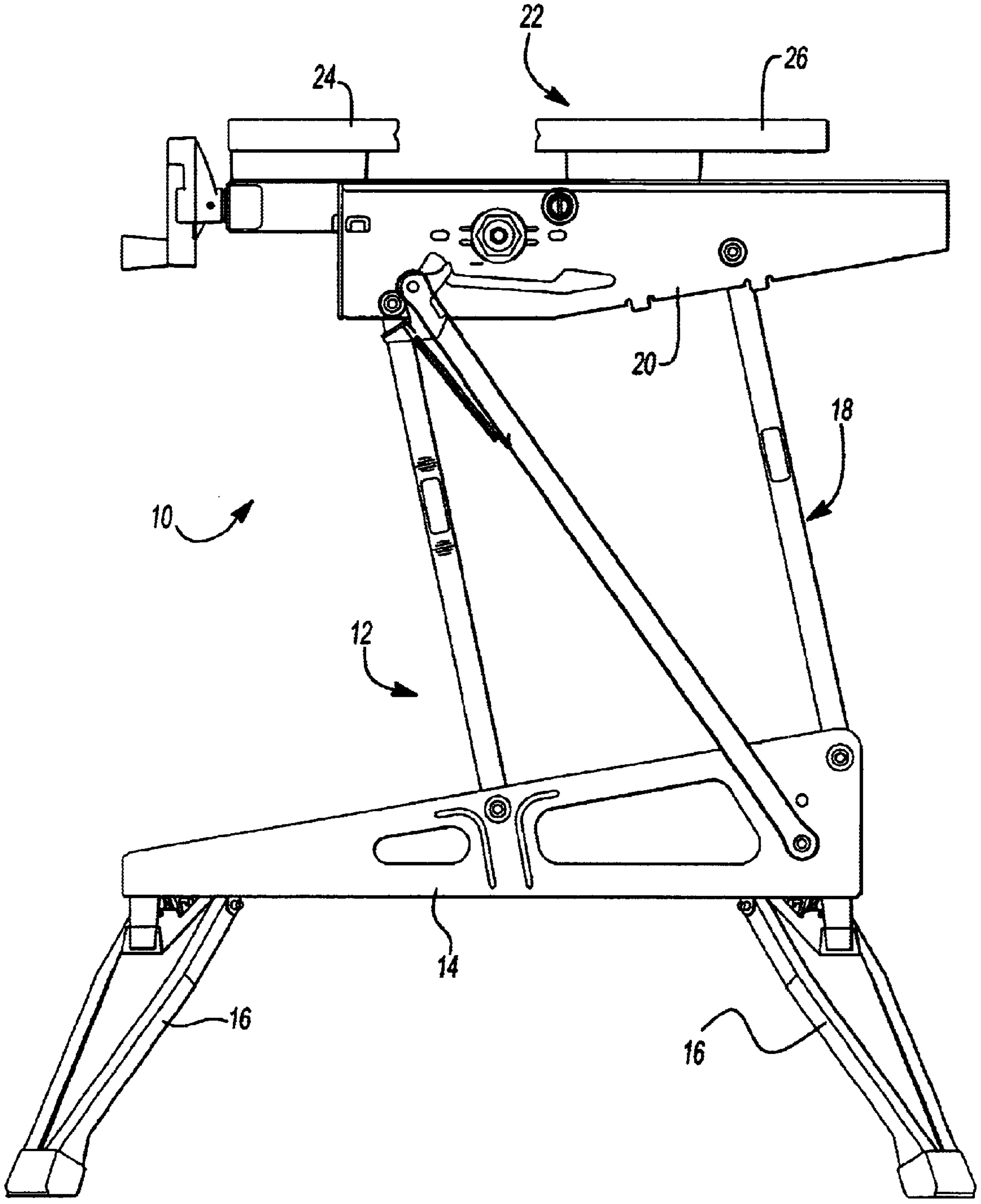
FIG. 2 is a side elevation view of the work bench with the top of FIG. 1.
Figure 3:
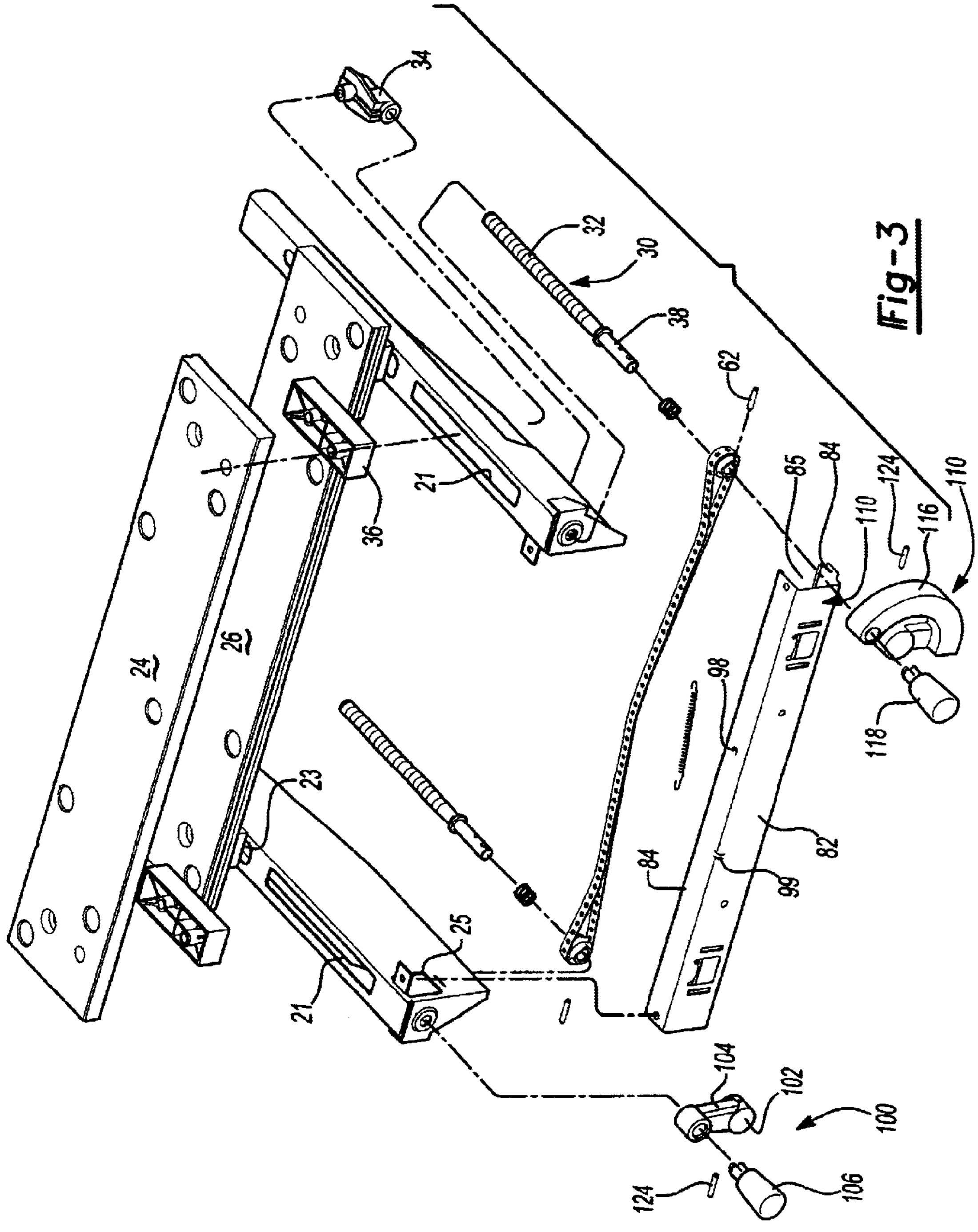
FIG. 3 is an exploded perspective view of FIG. 1.
Figure 4:
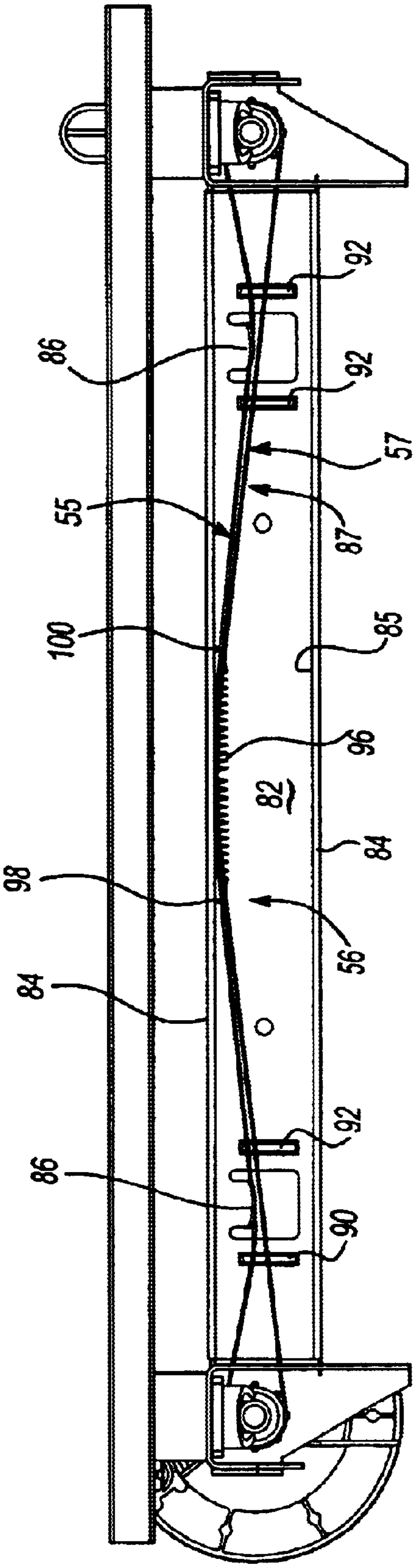
FIG. 4 is a cross-section view of FIG. 1 along line 4—4 thereof.
Figure 5:
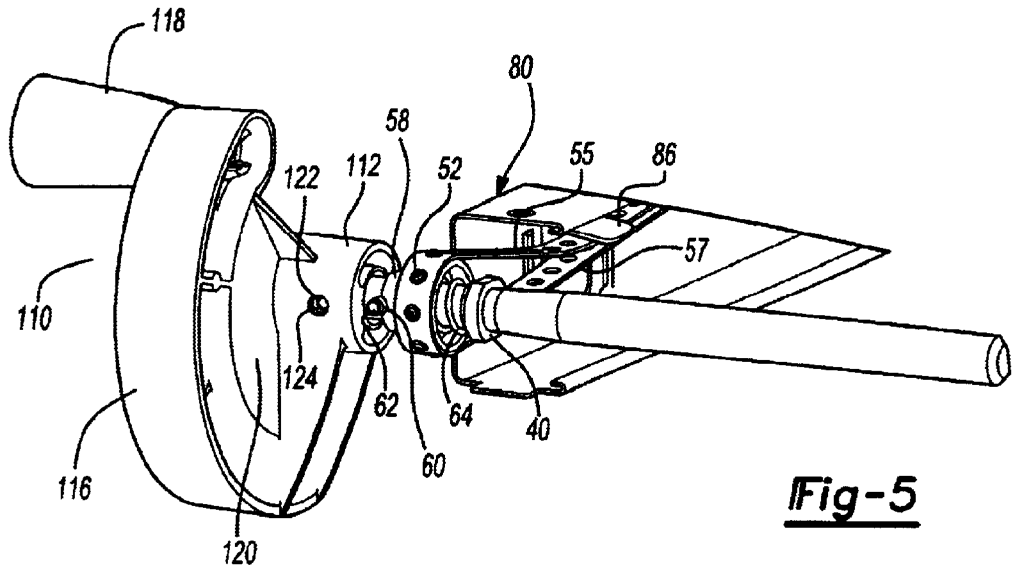
FIG. 5 is a perspective partially in cross-section view of a portion of the transmission drive of the present invention.
Figure 6:
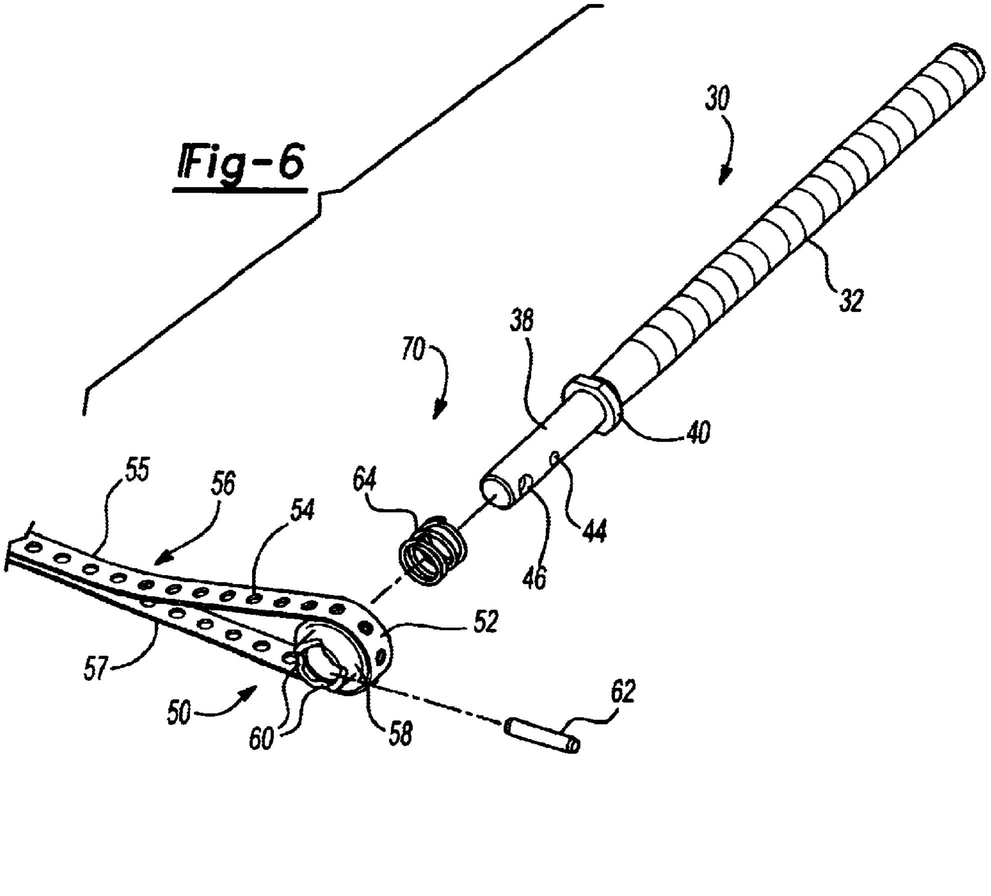
FIG. 6 is an enlarged perspective view of a portion of the drive.
Figure 10:
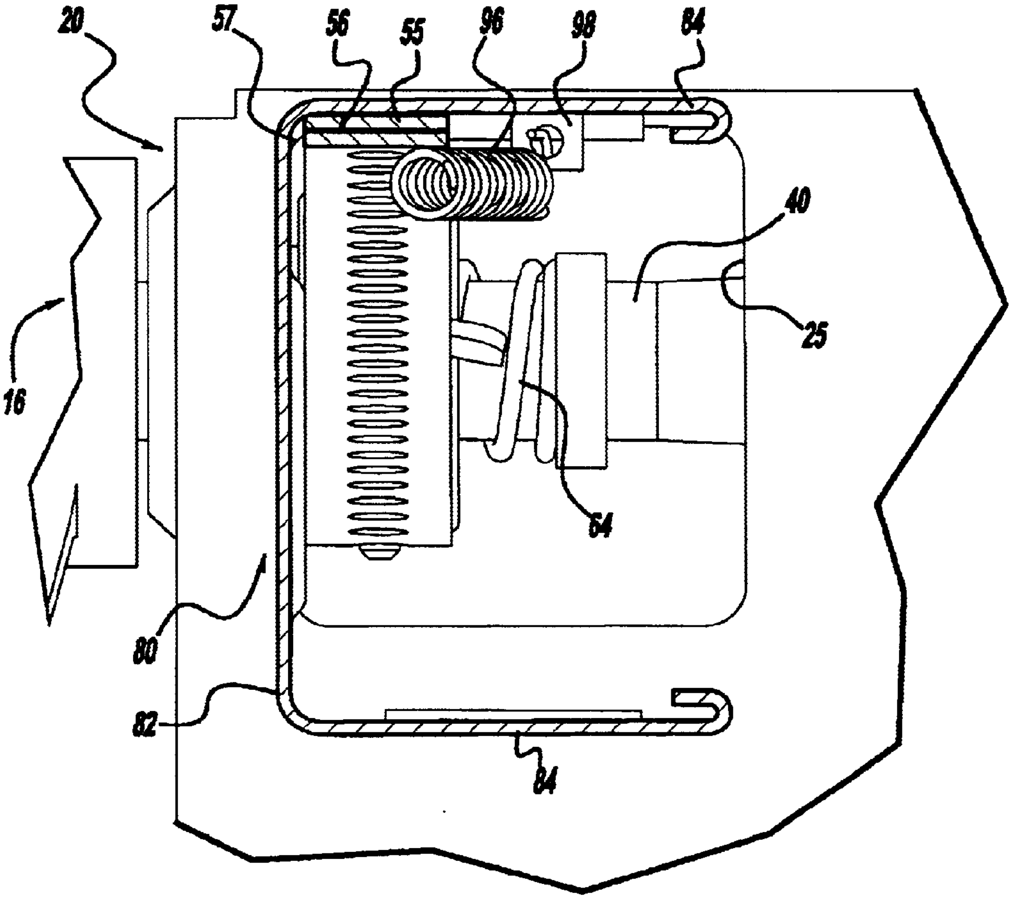
FIG. 10 is an enlarged cross-section view of FIG. 1 along line 10—10 thereof.

The preferred embodiment of the present invention is a work bench which is identified with the reference numeral 10. The work bench includes a frame structure 12 which includes a base 14, four foldable legs 16, two upright H supports 18 which extend from the base 16, and brackets 20 at the other end of the supports 18. The work bench 22 is generally formed from two members 24 and 26 which are coupled with the brackets 20.

The brackets 20 are hollow and include elongated slots 21 which enable movement of the front table 24 with respect to the brackets 20. Also, the brackets include apertures 23 to enable the second table portion 26 to be stationarily locked onto the brackets 20. An additional slot 25 is formed in the side of the brackets 20 to enable the belt 56 to pass into the brackets 20 and be coupled with the sprockets 50.

Two screws 30 are positioned within the brackets 20. The screws include a threaded portion 32 which includes a threaded pivot nut 34 which in turn, via a block 36, is coupled with the front moving member 24 of the work bench 22. Also, the screws 30 includes a smooth shank portion 38 which includes a portion which extends out beyond the bracket 20 as seen in FIG. 1. The smooth shank portion 38 includes a stop 40 as well as apertures 44 and 46.

Sprockets 50 are slidably positioned onto the smooth shank portion 38 of the screws 30. The sprocket 50, as shown, has projecting members 52 which extend into apertures 54 of the belt 56. However, if a chain is used, the projections may be substituted for recesses or the like. The sprocket 50 includes a hub 58 which includes slots or detents 60. The slots 60 are adapted to couple with a detent pin 62 which passes through aperture 44 of the screw 30.

A helical spring 64 is positioned on the smooth shank portion 38 abutting the stop 40 and the sprocket 50. The spring 64 along with the detent pin 62, sprocket 50 and sprocket slots 60 act as a clutch which limits the pressure which can be applied onto the workpiece. The slot or detent 60 in the sprocket enables transmission of light torques necessary to overcome friction to move the first member 24 providing one hand operation. At high clamping torques, the pin 62 disengages from the sprocket detent or slot 60 and compresses the clutch spring 64. When unclamping the workpiece, the clutch automatically engages the pin 62 via the sprocket detent 60 to once again allow one handed operation. The clutch 70 could be incorporated on both screws or a single clutch may be provided. In the case of a single clutch, the other sprocket will be securely pinned to the vise screw. Preferably, each of the screws 30 includes a clutch 70 as described above.

A guard 80 is positioned over the transmission belt or chain 56. The guard 80 includes a first wall 82 and at least one second wall 84, preferably two, which are perpendicular to the first wall 82 forming an overall U-shape and define a channel 85. The guard 80 includes two guides 86 stamped in and cut out of the first wall 82. The guides 86 extend substantially perpendicular to the first wall 80 into the channel 85. The guides 86 are substantially parallel with the second wall 82 and apply tension on the leading 55 side of the belt 56. The guides 86 help to tension the belt or chain as it moves during rotation of the screws 30. Also, the guides 86 extend from the wall 82 transverse to the direction of travel of the belt 56. The guard 80 spans the length of the belt 56 and is secured with the brackets 22 which, in turn, provides additional stability for the frame 12.

Two embossed alignment members 90, 92 sandwich the guide 86. The alignment members 90, 92 are stamped into the first wall 82 of the guard 80. The alignment members 90, 92 help to maintain the belt 56 or chain onto the sprockets 50 during the clamping modes.

A biasing member 96 is secured to the second wall 82 to automatically adjust for changes in belt length and to take up slack in the belt 56. The biasing member 96 is a helical spring which is secured on cut-outs 98, 99 in the guard 80. The spring 96 always provides for positive belt 56 or chain tension. The spring 96 is positioned under the belt 56 and tensions both the leading 55 and trailing 57 sides of the belt 56.

Each screw includes a handle 100 and 110. The handle 100 includes a hub 102, a handle arm 104 and a knob 106. The handle 110 includes a hub 112, a straight portion 114, a curved portion 116 and a knob 118. The hub 112 has a desired height which is larger than the straight portion 114, but less than the curved portion 116. The curved portion 116 has an overall truncated U-shape. Also, a connecting member 120 extends between the hub 112, straight portion 114, and curved portion 116. The handle 110 provides a visual indication to the user that the work bench clamping system may be rotated with one hand. Also, the hub 112 includes an aperture 122 which enables a pin 124 to pass there-through to secure the handle on the screw 30 through the aperture 46. Likewise, the handle 100 includes an aperture and a pin to secure it on the screw 30.

The work bench vise of the present invention is ordinarily operated as follows. One of the handles 100, 110 is rotated which, in turn, rotates either one of the screws 30. The rotation of the screw 30 rotates the sprocket 50 and via belt 56 rotates the other screw 30 via its sprocket 50. Thus, both of the screws 30 rotate at the same time, ordinarily, synchronously. As the user is utilizing one hand to rotate both screws 50, the user can use his other hand to hold the workpiece in between the two table members 24, 26. As the table members 24, 26 contact the workpiece, and especially if the workpiece has an irregular shape, the front table member 24 will contact the workpiece and the sprocket 50 will compress against the spring 64 and move away from the pin 62, thus engaging the clutch 70. If an irregular shaped workpiece is between the table portions, then one of the screws 30 will not rotate due to the clutching effect while the other will continue to rotate to clamp on the irregular shape of the workpiece. Once the workpiece is initially clamped and not over tightened, the individual screws can be shored up to give a firm grip onto the workpiece.

While the above detailed description describes the preferred embodiment of the present invention, the invention is susceptible to modification, variation, and alteration without deviating from the scope and fair meaning of the subjoined claims.

We claim:

1. A guard for a work bench having a drive transmission belt or chain comprising:

a first wall, at least one second wall extending substantially perpendicular to said first wall, and a first guide extending from said first wall, said first guide extending from said first wall transverse to the direction of travel of the transmission belt or chain and said first guide directly contacting the belt or chain for applying tension on the belt or chain, said guard secured between two brackets on the work bench and prohibiting access to the drive transmission belt or chain.

2. The work bench guard according to claim 1, wherein a second guide extends from said first wall.

3. The work bench guard according to claim 1, wherein a pair of parallel spaced second walls extend from said first wall.

4. The work bench guard according to claim 1, wherein an alignment member extends from said first wall.

5. The work bench guard according to claim 4, wherein said alignment member is stamped in said first wall.

6. The work bench guard according to claim 1, wherein a pair of alignment members sandwich said first guide member.

7. The work bench guard according to claim 1, wherein said second wall includes a biasing member for providing positive belt or chain tension.

8. The work bench guard according to claim 7, wherein said biasing member is a helical spring.

9. The work bench guard according to claim 8, wherein said first or second walls include cutouts for securing said spring.

* * * * *